United States Patent
Jacq et al.

(10) Patent No.: US 12,024,219 B2
(45) Date of Patent: Jul. 2, 2024

(54) VEHICLE STEERING WHEEL

(71) Applicants: Gweltaz Jacq, Poitiers (FR); Thierry Matrat, Vouille (FR); Jonathan Boittiaux, Poitiers (FR); Vincent Lemevel, Paris (FR); David Sourisseau, Buxerolles (FR)

(72) Inventors: Gweltaz Jacq, Poitiers (FR); Thierry Matrat, Vouille (FR); Jonathan Boittiaux, Poitiers (FR); Vincent Lemevel, Paris (FR); David Sourisseau, Buxerolles (FR)

(73) Assignee: Autoliv Development AB, Vårgårda (SE)

( * ) Notice: Subject to any disclaimer, the term of this patent is extended or adjusted under 35 U.S.C. 154(b) by 1170 days.

(21) Appl. No.: 16/480,116

(22) PCT Filed: Jan. 22, 2018

(86) PCT No.: PCT/EP2018/051439
§ 371 (c)(1),
(2) Date: Jul. 23, 2019

(87) PCT Pub. No.: WO2018/134400
PCT Pub. Date: Jul. 26, 2018

(65) Prior Publication Data
US 2019/0389501 A1    Dec. 26, 2019

(30) Foreign Application Priority Data
Jan. 23, 2017   (FR) ...................................... 1750539

(51) Int. Cl.
B62D 1/06    (2006.01)
B62D 1/04    (2006.01)
G01D 5/16    (2006.01)

(52) U.S. Cl.
CPC ............... B62D 1/06 (2013.01); B62D 1/046 (2013.01); G01D 5/16 (2013.01)

(58) Field of Classification Search
CPC . B62D 1/06; B62D 1/046; B62D 1/04; G01D 5/16
See application file for complete search history.

(56) References Cited

U.S. PATENT DOCUMENTS

| | | | |
|---|---|---|---|
| 2002/0017157 A1* | 2/2002 | Kreuzer ................... | B62D 1/06 74/552 |
| 2002/0026850 A1* | 3/2002 | Albayrak ................. | B62D 1/06 74/552 |

(Continued)

FOREIGN PATENT DOCUMENTS

| | | |
|---|---|---|
| DE | 29803133 A1 | 4/1998 |
| DE | 10155859 U1 | 7/2002 |

(Continued)

OTHER PUBLICATIONS

USPTO Machine Translation (retrieved from FIT database) of the Description of WO 2016/071002 A2, Bossler et al., May 12, 2016. (Year: 2023).*

(Continued)

*Primary Examiner* — Daniel D Yabut
(74) *Attorney, Agent, or Firm* — Matthew D. Thayne; Thayne and Davis LLC

(57) ABSTRACT

A vehicle steering wheel, comprising: —a framework (10) consisting of an electroconductive material; at least one sensor for detecting the position and/or contact (20) of a limb of the user on the steering wheel; at least one decorative part (30) comprising an electroconductive material; fixing means arranged so as to hold the decorative part (30) on the steering wheel; and at least one anchoring part (42) arranged so as to secure the fixing means onto the framework (10).

12 Claims, 1 Drawing Sheet

(56) References Cited

U.S. PATENT DOCUMENTS

| | | | | |
|---|---|---|---|---|
| 2004/0267422 | A1* | 12/2004 | Bossler | B60R 21/01552 701/41 |
| 2005/0050981 | A1* | 3/2005 | Warhover | B62D 1/06 74/552 |
| 2006/0236807 | A1* | 10/2006 | Yasuda | B62D 1/06 74/552 |
| 2017/0129527 | A1* | 5/2017 | Del Rio Garcia | B29C 45/14819 |
| 2017/0334477 | A1* | 11/2017 | Bossler | G01D 5/2417 |
| 2018/0348392 | A1* | 12/2018 | Nishio | B62D 1/046 |

FOREIGN PATENT DOCUMENTS

| | | |
|---|---|---|
| DE | WO2005023591 A2 | 3/2005 |
| DE | 102005013202 A1 | 9/2006 |
| WO | WO2016071002 A2 | 5/2016 |

OTHER PUBLICATIONS

International Search Report of the International Searching Authority for PCT/EP2018/051439 with mailing date of Feb. 22, 2018.
Translation of the International Search Report of the International Searching Authority for PCT/EP2018/051439 with mailing date of Feb. 22, 2018.

\* cited by examiner

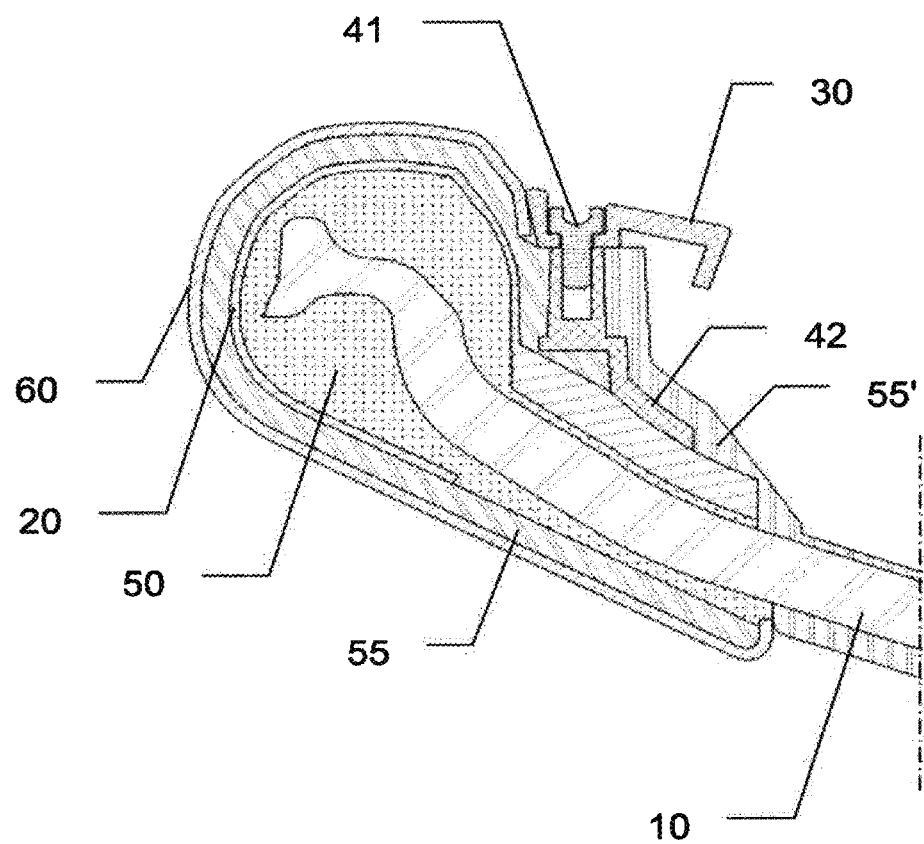

VEHICLE STEERING WHEEL

The present invention relates in general to a steering wheel intended to be mounted on a motor vehicle.

Vehicle steering wheels are known in the prior art that are equipped with sensors to determine whether the user is touching the rim, and in what location.

Document DE102005013202 for example describes a steering wheel comprising a framework, a piezoelectric film that could also be a capacitive sensor covered by a decorative part. However, such sensors are sensitive to the variations of the electrical property that they measure, and this document does not provide any solution to improve the measurement if the occupant touches an electrically conductive part, for example.

One aim of the present invention is to resolve the drawbacks of the aforementioned documents of the prior art and in particular, first of all, to propose a vehicle steering wheel allowing reliable detection of a contact or a position on the steering wheel of a limb of the user.

To that end, a first aspect of the invention relates to a vehicle steering wheel, comprising:
- a framework consisting of an electroconductive material,
- at least one sensor for detecting the position and/or contact of a limb of the user on the steering wheel,
- at least one decorative part comprising an electroconductive material,
- fixing means arranged so as to hold the decorative part on the steering wheel,
- at least one anchoring part arranged so as to secure the fixing means onto the framework, characterized in that the anchoring part is made from an electrically insulating material, so as to electrically insulate the fixing means from the framework.

The steering wheel according to the invention therefore comprises a presence and/or contact sensor for detecting a presence and/or contact and/or position of a limb of the user on the steering wheel. However, such a sensor typically operates by measuring a variation of an electrical property (resistance, capacitance, impedance, etc.), and the presence of the conductive material of the decorative part can disrupt the measurement if the user touches this conductive material of the decorative part, or even if one of his limbs is close to it. In order to avoid these disruptions, the present invention proposes a steering wheel that comprises an anchoring part that electrically insulates this conductive material from the decorative part of the conductive framework of the steering wheel, which is connected to the mass of the vehicle. It is therefore possible to fix the decorative part on the framework, via the anchoring part, which also serves as electrical insulation between the decorative part and the framework.

Advantageously, the fixing means comprise a fixing screw and the anchoring part is arranged between the fixing screw and the framework. A screw is typically made from metal, but the anchoring part insulates this screw, and therefore the conductive material of the decorative part, from the framework.

Advantageously, the anchoring part is a screwing insert arranged to couple with the fixing means. The anchoring part combines the functions of insulating and fixing the decorative part.

Advantageously, the anchoring part is fixed directly onto the framework. It can be screwed, clipped, centered on the framework.

Advantageously, the conductive material of the decorative part forms an outer surface of the steering wheel. In other words, the conductive material of the decorative part can be touched or at least very close to the user's hands, which are also, at the same time, in contact with the rim, and therefore detectable by the position and/or contact sensor on the steering wheel. The invention therefore prevents grounding of the user via the decorative part. At the very least, the invention avoids disturbing the physical property (resistance, capacitance, impedance, etc.) by insulating the user (who is touching or close to the decorative part while touching or being close to the rim of the steering wheel and its sensor) from the framework (by means of the anchoring part, which is insulating).

In any case, the conductive material of the decorative part is not covered by an insulating varnish or plastic film: it is bare. The conductive material of the decorative part can be a coating (chromium coating), or form the decorative part itself (solid aluminum, magnesium or stainless steel). It can also be a decorative part made from carbon fibers.

Advantageously, the decorative part is adjacent to the position sensor. In other words, the decorative part is at a distance from the position sensor, such that the user can touch, simultaneously with the same limb (his hand), the decorative part and the area where the position/contact sensor is located.

Advantageously, the vehicle steering wheel comprises a foam that at least partially covers the anchoring part. The foam, such as polyurethane, makes it possible to fasten the anchoring part onto the framework.

Advantageously, the anchoring part couples with the fixing means. It is possible to consider screwing, clipping, etc.

Advantageously, the anchoring part is overmolded onto the framework. The anchoring part is therefore directly fastened onto the framework.

Advantageously, the anchoring part is made from a polymeric material, such as polyamide, polyethylene, polypropylene, polycarbonate, polymethyl methacrylate, etc. The material may or may not have glass fiber fillers.

A second aspect of the invention relates to a motor vehicle including a steering wheel according to the first aspect of the invention.

Other features and advantages of the present invention will be seen more clearly from the following detailed description of an embodiment of the invention provided by way of a non-limiting example, and illustrated by the appended drawing, wherein:

FIG. 1 shows a cross-section of a steering wheel according to the invention.

FIG. 1 shows a cross-section of a steering wheel at a branch connecting a hub of the steering wheel to its rim. A framework 10, made from an electroconductive material (magnesium, aluminum, etc.), forms the support structure of the steering wheel.

At the rim, the framework 10 supports a first foam material 50 (polyurethane, for example), around which a detection device is positioned, which comprises a position and/or contact sensor 20, which in turn is covered with a second foam material 55 (polyurethane, for example), which is lastly covered with a skin 60.

The position and/or contact sensor 20 is typically a capacitive sensor, which can detect a position or the proximity of a limb of the user on the steering wheel. Indeed, the user, charged with electricity, can vary the electric capacitance and/or the resistance of a system, capacitance and/or resistance variations that can be measured by the position and/or contact sensor 20 when the user brings his hand closer, for example, which allows the detection thereof. In any case, the position and/or contact sensor 20 detects a change of a value of an electrical property, caused by the approach and/or the contact of the user's hand on the steering wheel.

At the branch, a decorative part 30 is fastened onto an anchoring part 42, which in turn is partially overmolded by the second overmolding material 55. As a result, the anchoring part 42 is secured to the framework by the second foam material 55 and another second foam material 55'.

The fixing is done by a screw 41 coupled to the anchoring part 42, which forms a screwing insert, but it is possible to consider other fixing modes, for example clipping.

For esthetic reasons, the decorative part 30 can comprise a metal coating, or even be made from metal (aluminum, magnesium, stainless steel). Due to the mounting proximity of the decorative part 30 with the rim, it is possible for the user's hand to touch the decorative part at the same time as an area of the rim subject to the detection done by the position and/or contact sensor 20.

To prevent the electrical characteristics measured by the position and/or contact sensor 20 from being disrupted by this conductive material of the decorative part, the invention proposes to insulate the latter from the framework 10.

To that end, it is provided to make the anchoring part 42 from an electrically insulating material, for example plastic. As a result, the decorative part 30 and the fixing screw 41 are insulated from the mass of the vehicle, and even if the user's hand is close to or in contact with the decorative part 30, this will not disturb the position and/or contact detection significantly.

It is possible to consider making the anchoring part 42 from plastic, polymer such as polyamide, polyethylene for example, or any equivalent.

It will be understood that various modifications and/or improvements obvious to the person skilled in the art can be made to the different embodiments of the invention described in the present description without going beyond the scope of the invention as defined by the appended claims.

The invention claimed is:

1. A vehicle steering wheel, comprising:
a framework made of an electroconductive material,
at least one sensor for detecting the position and/or contact of a limb of the user on the steering wheel,
at least one decorative part comprising an electroconductive material,
at least one fixing element arranged so as to hold the decorative part on the steering wheel,
at least one anchoring part arranged so as to anchor the fixing element onto the framework,
wherein the anchoring part is made from an electrically insulating material, so as to electrically insulate the fixing element from the framework, and wherein the at least one fixing element is configured to engage the at least one anchoring part to hold the decorative part on the steering wheel.

2. The vehicle steering wheel according to claim 1, wherein the fixing element comprises a fixing screw and wherein the anchoring part is arranged between the fixing screw and the framework.

3. The vehicle steering wheel according to claim 1, wherein the anchoring part is a screwing insert arranged to be coupled with the fixing element.

4. The vehicle steering wheel according to claim 1, wherein the anchoring part is fixed directly onto the framework.

5. The vehicle steering wheel according to claim 1, wherein the conductive material of the decorative part forms an outer surface of the steering wheel.

6. The vehicle steering wheel according to claim 1, wherein the decorative part is adjacent to the position sensor.

7. The vehicle steering wheel according to claim 1, comprising a foam that at least partially covers the anchoring part.

8. The vehicle steering wheel according to claim 1, wherein the anchoring part is coupled with the fixing element.

9. The vehicle steering wheel according to claim 1, wherein the anchoring part is overmolded onto the framework.

10. The vehicle steering wheel according to claim 1 in combination with a vehicle.

11. The vehicle steering wheel according to claim 1, further comprising a skin at least partially covering the vehicle steering wheel.

12. A vehicle steering wheel, comprising:
a framework made of an electroconductive material,
at least one sensor for detecting the position and/or contact of a limb of the user on the steering wheel,
at least one decorative part comprising an electroconductive material,
at least one fixing element arranged so as to hold the decorative part on the steering wheel,
at least one anchoring part arranged so as to anchor the fixing element onto the framework,
wherein the anchoring part is made from an electrically insulating material, so as to electrically insulate the fixing element from the framework, and wherein the at least one fixing element is configured to hold the decorative part on the steering wheel by engaging the at least one fixing element with the at least one anchoring part with at least a portion of the at least one decorative part in between the at least one fixing element and the at least one anchoring part.

* * * * *